(12) United States Patent
Karnalkar et al.

(10) Patent No.: US 7,773,736 B2
(45) Date of Patent: *Aug. 10, 2010

(54) VPN PRI OSN INDEPENDENT AUTHORIZATION LEVELS

(75) Inventors: Anup D. Karnalkar, Allen, TX (US); Thomas A. Hendricks, Newbury Park, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1285 days.

This patent is subject to a terminal disclaimer.

(21) Appl. No.: 11/132,113

(22) Filed: May 18, 2005

(65) Prior Publication Data

US 2006/0262918 A1    Nov. 23, 2006

(51) Int. Cl.
*H04M 1/66* (2006.01)
(52) U.S. Cl. .............. 379/200; 379/221.03; 726/2; 726/4; 726/15; 726/17
(58) Field of Classification Search ........... 379/200, 379/221.03; 726/2, 4, 15, 17
See application file for complete search history.

(56) References Cited

U.S. PATENT DOCUMENTS

| 5,467,388 | A | * | 11/1995 | Redd et al. ............ 379/210.02 |
| 5,974,133 | A | * | 10/1999 | Fleischer et al. ............ 379/230 |
| 6,175,618 | B1 | | 1/2001 | Shah et al. |
| 6,724,874 | B2 | | 4/2004 | Fleischer, III et al. |
| 2004/0170269 | A1 | * | 9/2004 | Madoch et al. ........ 379/221.15 |

* cited by examiner

*Primary Examiner*—Quynh H Nguyen
(74) *Attorney, Agent, or Firm*—Jackson Walker L.L.P.

(57) ABSTRACT

The present invention provides a method for determining an authorization for a call based on an Originating Station Number (OSN) in a Primary Rate Interface (PRI) in a virtual private network (VPN) customized dialing plan. A new access type is defined enabling first authorization levels to be assigned at the level of the OSN. A service logic database at a Service Control Point stores second authorization level required to complete the call. A combination of a Switch ID (SwID) of the Service Switch Point (SSP) through which the call is being made and the Trunk Group Number (TGN) of the Private Branch Exchange (PBX) along with the OSN or range of OSNs serves as a primary key to the database. The first authorization level is compared to the second authorization level required to proceed with a call, and an action is selected based on the results of the comparison.

12 Claims, 3 Drawing Sheets

VPN PRI OSN INDEPENDENT AUTHORIZATION LEVELS

BACKGROUND OF THE INVENTION

1. Field of the Invention

The present invention relates to the authorization levels for telephone calls. In particular, the present invention relates to assigning an authorization level to an originating station in a primary rate interface for a virtual private network.

2. Description of the Related Art

Phone networks for large organizations and businesses are generally designed to accommodate the structure of the organization. In many phone systems provided to such business operations, multiple telephone receivers, or originating stations, connect to a PBX (Private Branch Exchange). A PBX is a telephone switching center that is owned by a private business. The PBX provides an interface over an ISDN line (Integrated Services Digital Network) to an Inter-exchange Carrier Service Switching Point (IXC SSP, or SSP). ISDN permits voice, data, text, graphics, music, video, and other source material to be transmitted over existing telephone wires. ISDN generally provides two levels of service: a Basic Rate Interface (BRI) which is an interface from the Service Switching Point (SSP) in the local exchange node or a Central Office, intended for the home and small enterprises, and a Primary Rate Interface (PRI) which is an interface from the Service Switching Point (SSP) or the local exchange node/Central Office and could also be an interface from the IXC SSP, for larger users. Both rates include a number of B-channels for carrying data, voice, and other services, and D-channels for carrying control and signaling information. The Inter-exchange Carrier Service Switching Point (IXC SSP) is the Long Distance switching node in a telephone network. The IXC SSP communicates with the Public Switched System Telephone Network (PSTN) telephone system based on copper wires carrying voice generally over a Feature Group D (FGD) connection. Feature Group D is a type of telecommunication trunk used to provide "equal access" capability from telecommunication carriers and central offices (where the switching equipment is located and customer lines are connected and terminated) to the access tandem. In addition to communicating with the PSTN, the IXC SSP sends messages to a "Service Control Point" (SCP) to query databases about subscriber service information and routing information of a subscriber telephone call.

A virtual private network (VPN) is a method devised to use a public telecommunication infrastructure, including the Internet, to provide remote offices or individual users with secure access to their organization's virtual network. A VPN works by using the carrier's shared infrastructure while maintaining privacy through various security and dialing procedures.

Large organizations often provide a hierarchical authorization structure. Some current methods enable transfer of the authorization structure to a phone connection system for the organization. Currently, authorization levels are assigned at the PBX level, which means that originating stations that share the same PBX are assigned the same level of authorization. When a call is made at an originating station hosted by a PBX, a Trunk Group Number (TGN) identifying the PBX and a Switch ID (SwID) identifying the SSP are used to determine an authorization level. For example, the TGN and SwID values can be used to query a database of authorization levels. Access tables have been used to determine the membership of a Dedicated Access Line (DAL) in a VPN customized plan. In this case, two existing values (e.g. DAL and ISDN) differentiate a 'plain' DAL from a Primary Rate Interface (PRI) DAL, respectively. The Access Table identifies the type of DAL being used and assigns a DAL-level private number to the call. In another table, the DAL-level private number is associated to an Authorization Level that is applied to all customer stations connected to long-distance (LD) using that DAL.

Known authorization systems have operated under the assumption that stations connected to the same PBX use the same level of authorization. Thus, authorization levels assigned to the PBX generally might not accommodate authorization levels of the business at the level of a specific employee. For example, it may be desirable that a manager's station be set for higher calling privileges than his subordinates, or that a company president be assigned a privilege level that bypasses all call restrictions while the manager's and his subordinate employees' calling capabilities remain restricted. There is therefore a need for a method and apparatus that provides authorization at the individual station level that are behind a PBX.

SUMMARY OF THE INVENTION

The present invention provides a method and apparatus for determining an authorization for a call based on an Originating Station Number (OSN). An OSN is provided with an associated authorization level (first authorization level) indicating the types of calls that can be completed from the originating station. A second authorization level indicating the authorization level required to proceed with a call is typically stored in a database at a Service Control Point (SCP) in a telephone network. The primary key of the database typically is a UserID comprising a combination of a Switch ID (SwID) of the Service Switch Point (SSP) through which the call is being made, the Trunk Group Number (TGN) of the Private Branch Exchange (PBX) over which the call is made, and the Originating Station Number (OSN). In an exemplary embodiment, the invention is usable over a Primary Rate Interface (PRI) line. When a call is made, several identification numbers are assembled at the SSP, such as a dialed telephone number, the OSN, the TGN, the SwID, and an identifying intelligent network trigger of a virtual private network (VPN) customized dialing plan. A VPN authorization node designates a level of authorization required to proceed with the call. The SSP combines the SwID and the TGN of the call to create a UserID, referred to herein as SWTR. The SWTR, OSN, and the VPN trigger criteria are sent to the SCP in a query, and the first authorization level is retrieved from a VPN Service Level Table, based on the SWTR+OSN match. The first authorization level is then compared to the second authorization value required of the call based on any criteria that determines the need (example—International call, Time of day, VPN on-net or off-net call), and an action is selected based on the results of the comparison. Some actions that may be taken include but are not limited to: i) connecting the call over the virtual private network (VPN); ii) disconnecting the call; iii) connecting the call using a pseudo-private number granting authorization through the PBX (in case of OSN level authorization level not needed or defined); and iv) prompting a caller for an authorization code (in case the authorization level of caller based on OSN is less than the required level).

BRIEF DESCRIPTION OF THE DRAWINGS

For a detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

The present invention addresses the independent assignment of an Authorization Level to an individual Primary Rate Interface (PRI) Originating Station Number (OSN), for a carrier-provided and customer-defined Voice Virtual Private Network (VPN).

Figure 1:
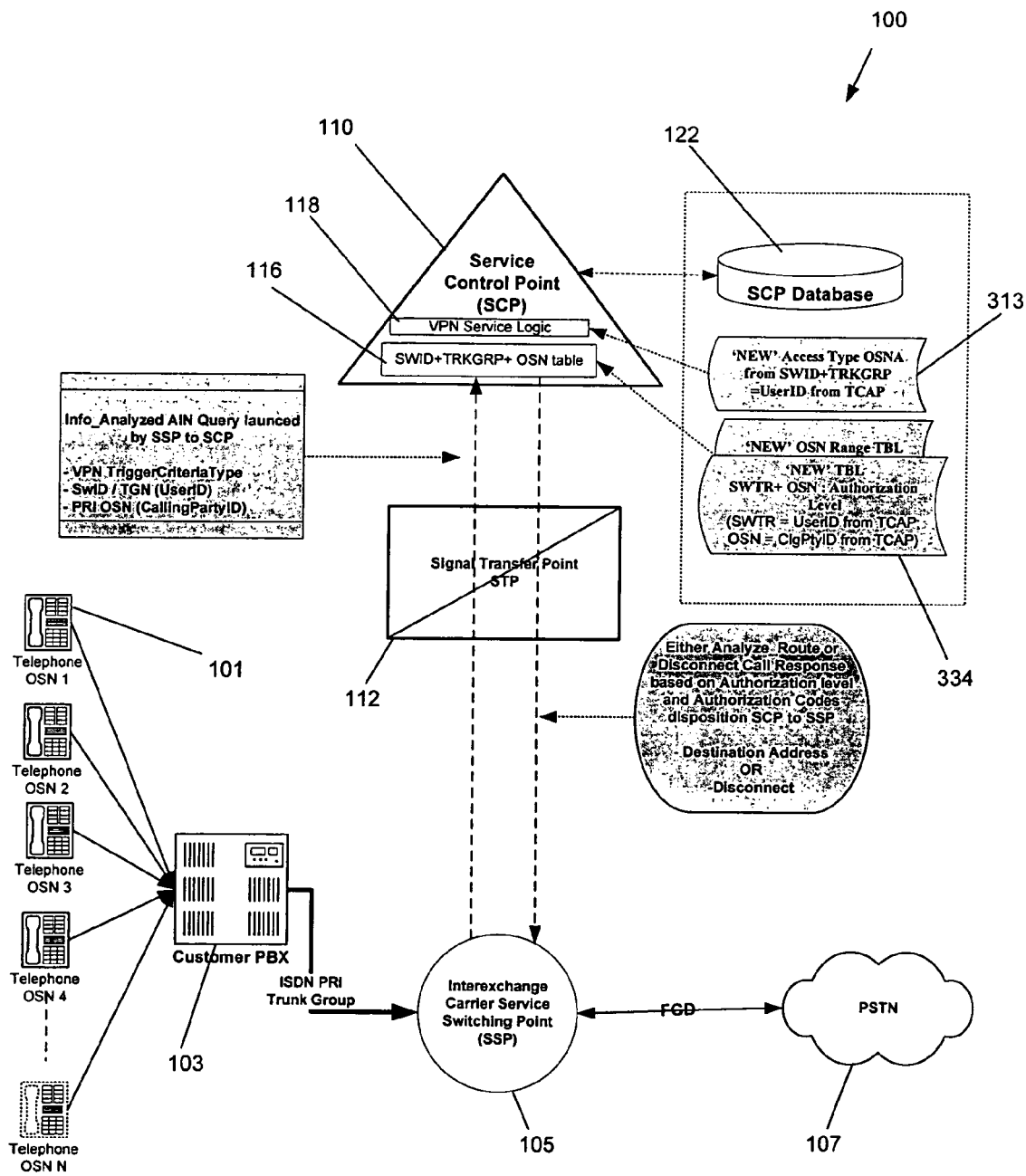
FIG. 1 illustrates an exemplary portion of a telecommunications network for authorizing a call according to the present invention.

FIG. 1 illustrates an exemplary portion of a telecommunications network 100 in which an authorization for a call to proceed is determined according to the present invention. Private Branch Exchange (PBX) 103 is linked to several telephone receivers, or originating stations 101. Each originating station has an originating station number (OSN) assigned to it, typically the ten-digit telephone number of the originating station. The PBX 103 exchanges signals with a Service Switching Point (SSP) 105. Typically, a PRI ISDN line (Integrated Services Digital Network) link connects the PBX and the SSP. Originating stations linked to the PBX share outside lines for making telephone calls external to the PBX. Although many PBXs can be associated with an SSP, only one SSP and one PBX are shown in FIG. 1 for illustrative purposes. The SSP further exchanges signals with the Public Switched Telephone Network, or PSTN 107, via a Feature Group D (FGD) trunk. The SSP, SCP and PBX utilize processors for execution and electronic storage such as disk and a relation database component for database storage.

Identification numbers are assigned to these network elements. For example, the ISDN link between PBX and SSP is identified by a Trunk Group Number (TGN). Also, each SSP has an associated Switch ID (SwID). These identification numbers can be transferred between network elements for verification purposes.

The SSP queries a Service Control Point (SCP) 110 to obtain an instruction for how the call is to proceed. The query typically includes a VPN Trigger Criteria Type, which indicates a customized dialing plan applicable to the OSN, an SWTR (=SwitchID+Trunk Group Number) from the SSP in the form of a UserID parameter, and the OSN (Calling Party ID). The SWTR is a combination of the SwID and the TGN, and the two are combined at the SSP. In an exemplary embodiment of the present invention, the SwID is a four-digit number zero-padded from the left and the TGN is a four-digit number zero-padded from the left.

Since there are typically several operating SCPs or SCP pairs for redundancy, a Signal Transfer Point (STP) 112 routes the query to the appropriate SCP. Only one SCP is shown in FIG. 1 for illustrative purposes. The routing of the query can be performed using, for example, load balance or round robin techniques. Transaction Capabilities Application Part (TCAP) based protocol, an ISDN application protocol, can be used for messaging between the SCP and the SSP.

At the SCP 110, a response to the query is determined by searching the SCP database 122 and the respective stored service logic. The SCP database comprises a VPN SWTR Access Table 313 and at least one VPN Service Level Table 334. The present invention modifies an existing VPN SWTR Access Table 313 to accept a new 'access type' value. Two existing values (e.g., DAL, ISDN) currently identify the DAL type in the Access Table. The two existing values differentiate a 'plain' DAL from a PRI DAL, respectively. The new DAL access type provided in this example of the invention is a third value (—e.g., OSNA—) that identifies a PRI DAL utilizing OSN authorization level functionality of the present invention. The new access type may be assigned to a DAL whether or not a new VPN Service Level table has been provided.

The VPN Service Level Table 334 associates a specific authorization level (first authorization level) to one or more originating stations connected to the long distance (LD) network over a PRI DAL. The new VPN Service Level Table (e.g., OSNA PRI) comprises the following elements: a Switch ID (the LD switch identity to which the PRI DAL is connected), a TGN (Trunk Group Number within the Switch of the DAL), an authorization level (first authorization level), and an OSN (i.e. a telephone number). The OSN is generally established using an OSN Range (OSN start/end sequence) for assigning a common authorization level to multiple, consecutively-numbered stations as desired.

VPN Service Logic 118 operates on the query through the SWTR Access Table 213. The SWTR and OSN (116) are used to obtain the first authorization level from the VPN Service Level Table. The SWTR serves as a primary table key to the Service Level Tables that uniquely identifies a PRI Dedicated Access Line for all customers within the VPN Service. The response from the SCP to the SSP is based on the outcome of a comparison of first and second authorization levels or of a comparison of the second authorization level with an authorization level associated with entered authorization codes. The call can either be connected to the dialed number or blocked from completing to the dialed number.

Figure 2:
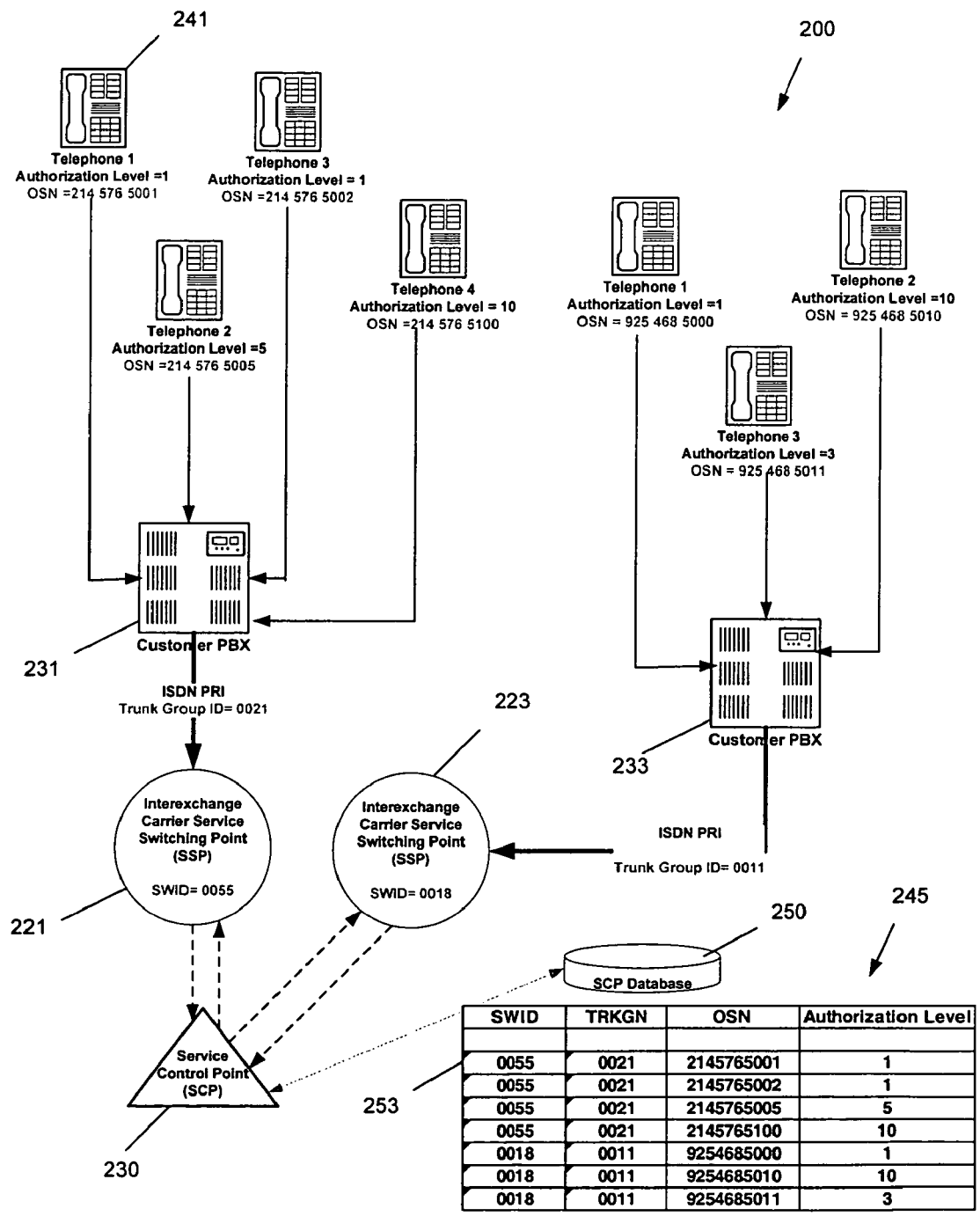
FIG. 2 illustrates the elements of a telecommunications network and corresponding entries in an authorization database.

FIG. 2 illustrates the elements of the telephone network 200 and corresponding entries in an authorization database 245. The SSPs 221 and 223 communicate with the Service Control Point 230. SSP 221 communicates with PBX 231, and SSP 223 communicates with PBX 223. Each PBX has several originating stations which connect to it. Each originating station connected to a PBX generally shares a commonality with other originating stations connected to the same PBX. For instance, originating stations connected to PBX 231 are in the same area code (214). Similarly those originating stations connected to PBX 233 share another separate area code (925). Each originating station typically has a unique OSN assigned to it (generally, the telephone number of the telephone unit). Also, each originating station has an authorization level assigned to it (first authorization level).

As an example of the method and apparatus of the present invention, a customer makes a call using a VPN using Telephone 1 (241). Telephone 1 communicates with PBX 231. Along with the number dialed, Telephone 1 forwards the OSN ('214-576-5001') to PBX 231. PBX then forwards this data along with the PBX Trunk Group ID ('0021') to SSP 221. The SSP 321 combines the Switch ID ('0055') and the Trunk Group ID ('0021') to form a SWTR. The SWTR and OSN number (as well as a VPN trigger criteria) are included in a query to the SCP 230. The SCP uses these values to obtain from the SCP database 250 a first authorization level that must match or exceed the second authorization level in order to proceed with the call. An exemplary table 245 of the SCP database is shown. Entries are listed by SwID, TGN, and OSN. These values, which have been obtained from the network SCP, are used to return the VPN Authorization Level (first authorization level) from the VPN Service Level Table. For the call originating from Telephone 1 (241), an entry exists in table 245. The entry corresponding to Telephone 1 is the first entry (253).

Figure 3:
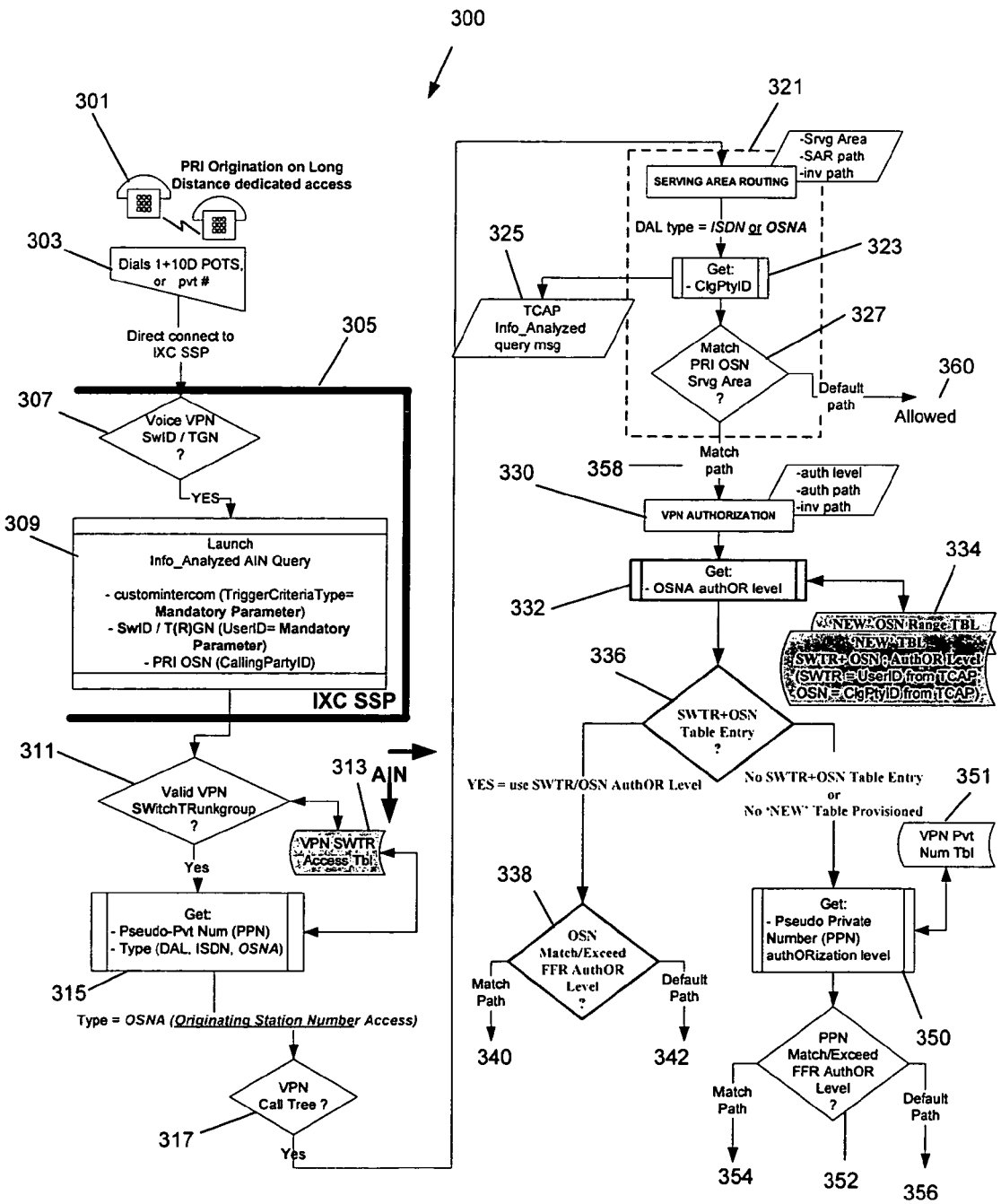
FIG. 3 displays a flowchart illustrating a method of authorizing a call according to one aspect of the present invention.

FIG. 3 displays a flowchart 300 illustrating a method of authorizing a call in one aspect of the present invention. A call originates from originating station 301. A 10-digit calling number 303 (or a private number) is sent along with the OSN to the PBX. The PBX forwards the signal along with the Called Party number and a OSN available for the PBX to the SSP 305. The SSP assigns a SwID to the call and creates the SWTR from the SwID and the TGN (Trunk Group Number of the PBX interface). A determination is made at the SSP that the signal being handled is a voice transmission to be made over a voice call subscribed to VPN (Box 307) rather than a data transmission, etc. Once Voice VPN subscription is affirmed, a query is sent to the SCP. The query comprises the elements of Box 309, such as the SWTR, the OSN, and a VPN TriggerCriteriaType indicating a VPN customized dial plan.

The procedure of the flowchart from Box 311 onward takes place at the SCP. At Box 311, a query is made to all of the SWTR Access Tables 313 to determine whether the SWTR (from the SSP) is a valid VPN customer. In case the SWTR is valid, the customer group name (i.e. VPN1, etc.), a pseudo-private number (PPN), and a type of access (i.e. Originating Station Number Access) are obtained. The PPN is a number assigned based on the ISDN line used, and the value of the PPN is assigned to the PBX access rather than individual originating stations. As a result, all originating stations linked to that PBX receive the same level of authorization because the same PPN is used. In the event that the Originating Station Number Access (OSNA) feature of the present invention is not available to the system, the PPN can be used to connect calls. When the OSNA is selected, the logical flow passes through a VPN call tree (Box 317) to obtain a service class determining how a call is to handled. Service classes can include, for example, ODR (Origination Dependent Routing), DDR (Destination Dependent Routing), or Time-of-Day routing, etc.

The portion of the flowchart between Box 321 and Box 327 checks the OSN for participation in a provided VPN plan. For the purposes of illustration Serving Area Routing has been used as an example of a VPN plan. Serving Area Routing depends upon the origination point or number of the call. For instance, a calling plan may be assigned to Texas that handles a call differently than the same type of call originating, for example, in California. The OSN (Calling Party ID) is obtained (Box 323) from the query message (325) and checked to see whether the OSN is within the Service Area (Box 327). If the OSN is within the Service Area (available to the VPN plan), the call may be routed via a match path (358) to be checked for authorization. Otherwise, for a call not within the Service Area (not available to the VPN plan), the call would be routed via a 'No Match' path (360).

For those calls that have been sent along the 'Match' patch (358), VPN authorization level (Box 330), which is the authorization level required at a minimum to proceed with the call (the second authorization level), is then determined. At Box 332, the first authorization level is retrieved from VPN Service Level Table 334 using SWTR and OSN as lookup values. In Box 336, a check is made that the retrieved table entry is not null, since there is the possibility that no authorization level has been entered or that a new Table is not provided. If there is a table entry, the SWTR+OSN (first) authorization level is checked (Box 338) against the (second) authorization level required for the call to proceed. If the first authorization level of the SWTR+OSN matches or exceeds the second authorization level required to proceed with the call, then the call proceeds down a match path 340 (call is completed). If the first authorization level does not match or exceed the second authorization level required, the call proceeds down a default path 342. The default path may provide many choices, such as blocking the call, performing another function with the call, etc. In one embodiment, a request may be made to the caller to provide an authorization pass code. The authorization pass code may have an associated authorization level. The level of the pass code can be checked against required VPN authorization level (second authorization level) at Box 330 to override the authorization process.

Returning to 336, if there is no table entry in the VPN Service Level Table, or if the Table is not provided, the logical flow passes to Box 350. At Box 350, the authorization level of the PPN previously obtained at Box 315 is used. The authorization level of the PPN can be obtained from a query of VPN Private Number Table 351. At 352, the PPN authorization level is compared to the second authorization level required to proceed with the call. If the PPN authorization level matches or exceeds the second authorization level, then a match path 354 can be taken and the call is completed. If the PPN authorization level does not match or exceed the second authorization level, then a default path 356 can be taken.

Multiple Authorization features may be encountered during a single call, and each instance of the Authorization feature has its own Authorization Level independent of any other instance (current functionality). The call processing logic applies each time an Authorization feature is encountered. An initial level of privilege is set via assignment of an Authorization Level to a caller. A means for the caller to increase that privilege level (by entering an appropriate Authorization Code with a higher associated Authorization Level) is then provided for the purpose of bypassing call screening restrictions.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium, as listed herein and including art-recognized equivalents, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A computerized method for determining an authorization level for a call in a communication network comprising:
    accessing, by a service control point in the communication network, a service logic database to compare a first authorization level for the call assigned at an Originating Station Number (OSN) level with a second authorization level required to proceed with the call, wherein accessing the service logic database comprises combining a Service Switch Point identifier (SWID) and a Trunk Group Number identifier (TGN) to obtain a primary key to the database, wherein the call accesses a virtual private network (VPN); and
    selecting, by the service control point, an action based on a comparison of the first authorization level to the second authorization level;
    wherein the combination of the SWID and the TGN is further combined with the OSN to identify the first authorization level associated with the OSN.

2. The method of claim 1, wherein the call is transmitted over a Primary Rate Interface (PRI).

3. The method of claim 1, wherein selecting an action further comprises processing the call based on the comparison of the first and second authorization levels.

4. A tangible non-transitory computer readable storage medium containing instructions that when executed by a computer perform a method for determining an authorization level for a call in a communication network comprising:
    accessing, by a service control point in the communication network, a service logic database to compare a first authorization level for the call assigned at an Originating Station Number (OSN) level with a second authorization level required to proceed with the call, wherein accessing the service logic database comprises combining a Service Switch Point identifier (SWID) and a Trunk Group Number identifier (TGN) to obtain a primary key to the database, wherein the call accesses a virtual private network (VPN); and
    selecting, by the service control point, an action based on a comparison of the first authorization level to the second authorization level;
    wherein in the method a combination of the SWID and the TGN is further combined with the OSN to identify the first authorization level associated with the OSN.

5. The non-transitory medium of claim 4, wherein in the method the call is transmitted over a Primary Rate Interface (PRI).

6. The non-transitory medium of claim 4, wherein in the method selecting an action further comprises proceeding with the call based on the comparison of the first and second authorization level.

7. A system for determining an authorization level for a call in a communication network comprising:
    a service logic database; and
    a processor for:
    accessing, by a service control point in the communication network, a service logic database to compare a first authorization level for the call assigned at an Originating Station Number (OSN) level with a second authorization level required to proceed with the call, wherein accessing the service logic database comprises combining a Service Switch Point identifier (SWID) and a Trunk Group Number identifier (TGN) to obtain a primary key to the database, wherein the call accesses a virtual private network (VPN); and
    selecting, by the service control point, an action based on a comparison of the first authorization level to the second authorization level;
    wherein a combination of the SWID and the TGN is further combined with the OSN to identify the first authorization level associated with the OSN.

8. The system of claim 7, wherein the call is transmitted over a Primary Rate Interface (PRI).

9. The system of claim 7, wherein selecting an action further comprises proceeding with the call based on the comparison of the first and second authorization levels.

10. The method of claim 1, wherein said Trunk Group Number identifier comprises a Trunk Group Number associated with a private branch exchange (PBX) connected to the Service Switch Point.

11. The tangible non-transitory computer readable medium of claim 4, wherein said Trunk Group Number identifier comprises a Trunk Group Number associated with a private branch exchange (PBX) connected to the Service Switch Point.

12. The system of claim 7, wherein said Trunk Group Number identifier comprises a Trunk Group Number associated with a private branch exchange (PBX) connected to the Service Switch Point.

* * * * *